United States Patent [19]

Yashar et al.

[11] Patent Number: 5,314,254
[45] Date of Patent: May 24, 1994

[54] STIFFNESS ENHANCER FOR MOVABLE STAGE ASSEMBLY

[75] Inventors: Frank D. Yashar; Charles R. Meyer; John A. Gurley, all of Santa Barbara, Calif.

[73] Assignee: Digital Instruments, Santa Barbara, Calif.

[21] Appl. No.: 970,875

[22] Filed: Nov. 3, 1992

[51] Int. Cl.$^5$ .................. F16C 29/02; F16C 29/12
[52] U.S. Cl. .......................... 384/49; 384/8; 384/10; 384/25; 384/54
[58] Field of Search ............ 384/8, 10, 25, 43–45, 384/49, 50, 54

[56] References Cited

U.S. PATENT DOCUMENTS

| 4,529,255 | 7/1985 | Piotrowski | 384/50 X |
| 4,648,725 | 3/1987 | Takahashi | 384/10 X |
| 4,773,770 | 9/1988 | Osawa et al. | 384/45 |
| 4,918,846 | 4/1990 | Tsukada | 384/45 X |
| 4,940,339 | 7/1990 | Amano | 384/25 |

FOREIGN PATENT DOCUMENTS

| 116119 | 6/1986 | Japan | 384/49 |
| 229913 | 9/1990 | Japan | 384/8 |
| 144111 | 6/1991 | Japan | 384/8 |
| 151017 | 5/1992 | Japan | 384/49 |

OTHER PUBLICATIONS

Microelectronics Manufacturing Technology (pp. 60–64), May 1991. "Nanometer X-Y Positioning Stages for Scanning and Stepping", by Anwar Chitayat, Anorad Corporation, Hauppauge, N.Y.

Primary Examiner—Thomas R. Hannon
Attorney, Agent, or Firm—Oblon, Spivak, McClelland, Maier & Neustadt

[57] ABSTRACT

A stiffener assembly which provides for improved performance of a movable stage arrangement. Often, it is desired to provide a movable stage arrangement in which a stage moves linearly with respect to a stationary base. In many applications, it is necessary for the stage to move to successive rest positions, with movement of the stage inhibited at each of the reset positions. The stiffener of the present invention allows for controlled movement of a stage along its direction of travel, with the stiffener inhibiting undesired movement when the stage is at a rest position. In one form, a stiffener extends in the direction of travel of the stage, with one end of the stiffener assembly mounted to the stationary base, and the other end urged into frictional contact with the movable stage by a force applicator. As a result, the stiffener is placed in frictional contact with the movable stage. The coupling of the stage to the stiffener is insufficient to impede desired movement of the stage, however undesired movement at rest positions of the stage are avoided.

31 Claims, 5 Drawing Sheets

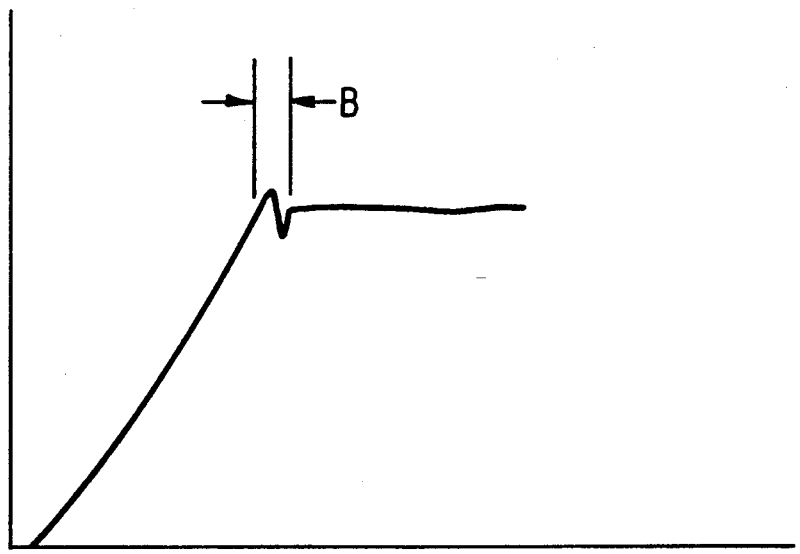
F I G . 4

STIFFNESS ENHANCER FOR MOVABLE STAGE ASSEMBLY

BACKGROUND OF THE INVENTION

1. Field of the Invention

The invention relates to movable platform devices, particularly the type in which a movable platform or stage is supported on a stationary member or base. In particular, the invention provides a stiffener which prevents undesirable movement of the stage with respect to the base. Although the present invention is particularly advantageous in extremely high precision stage assemblies, various aspects of the present invention are also applicable to a wide variety of applications in which a controlled sliding movement is utilized.

2. Discussion of the Background

Assemblies in which sliding movement is provided between a first movable member and a second stationary member are well known for a wide variety of applications. Typically, a movable platform will be supported for sliding movement with respect to a stationary member or base. A bearing system including, for example, ball bearings or cross roller bearings provide for sliding support of the movable member with respect to the stationary member or base. Such arrangements can provide linear movement, or compound movement, for example by providing a pair of superposed sliding assemblies with respective movements which are orthogonal to one another. Such single or multi-directional arrangements can be utilized in lathes, drill presses, plotters, or even in seat adjustment mechanisms for a vehicle. Some applications require extremely precise and well controlled movement of the movable member or stage with respect to the stationary member or base. For example, when a movable platform is utilized for controlled movement of a sample which is being examined by a microscope, movement must be extremely precise and controlled, while avoiding undesired movement such as vibrations.

FIG. 1 shows a typical movable stage arrangement in which a stage 4 is supported upon a stage base 7 via ball bearing assembly 5, which includes ball bearings 6. The stage 4 is thus linearly movable with respect to the stage 7 in a direction into and out-of the drawing figure. In addition, controlled movement of the stage with respect to the base is provided by a leadscrew assembly shown generally at 8. The leadscrew is typically assembled upon the stationary stage base, with the leadscrew nut attached to the movable stage top. Rotation of the lead screw thereby controls relative movement between the stage 4 and the base 7. Further, as shown in FIG. 1, such an arrangement can be utilized for controlled movement of a sample 3 being examined by a probe microscope to allow the probe 2 of the microscope 1 to examine the sample 3.

In the context of a scanning probe microscope, the stage is utilized to provide linear travel by moving the stage top to successive new locations, with the stage top hopefully maintaining a fixed position at each stopping point. The sample or specimen may then be inspected, for example by a scanning probe microscope 1 which is mounted above the stage. Typically, bearing arrangements which provide the relative movement between the stage and base are stiff in all possible axes of motion, except for the axis of travel of the stage. However, in the context of an extremely sensitive microscope, even the slightest of vibrations can impose severe difficulties in obtaining satisfactory resolution of the sample being examined. Often, even vibrations from a spoken voice can severely deteriorate the information obtained by the microscope.

Providing high stiffness in holding the stage top in place is thus extremely important. In the case of a scanning probe microscope, the microscope can have a resolution of less than one angstrom. Therefore, the sample and stage must be held rigidly in place such that any vibrations or movement are a small fraction of an angstrom. However, while the prevention of inadvertent movement is essential, any technique utilized for fixing a position should not impede the intended motion of the stage.

FIG. 2 shows one attempt to maintain a fixed rest position of a movable stage, wherein like reference numerals designate corresponding parts to the stage shown in FIG. 1. In the FIG. 2 arrangement, a clamp device 9 is provided at a location adjacent to the movable stage 4. When the stage is moved to a desired rest position, the clamp device 9 is activated such that it engages the movable stage 4 and thus holds the top rigidly in place. The clamp is then moved out of engagement for movement to a next rest position. Such an arrangement suffers from a number of shortcomings. For example, when the clamp is activated, new forces are introduced into the system, and particularly upon the stage. As a result, the stage and/or sample mounted thereon can move, making it extremely difficult to achieve and maintain a precisely desired rest position. The bearings have a finite stiffness, and the new forces introduced by the clamp typically cause microns of undesired motion of the stage top.

In addition, a clamp arrangement also complicates the system, since it requires various components associated with control of the clamp. Typically, the stages are automatically controlled, and the electrical power of an on/off relay must be provided, as well as an automatically controlled coordination of the clamping with the movement of the stage. In addition, the clamp is often piezoelectrically activated, and as such, can require high voltages often between 100–1000 volts. Electrical power utilized with the clamp can also introduce heat into the system which is particularly undesirable in extremely precise operations. In the case of solenoid actuation of the clamp, the amount of undesirable heat generated by the solenoid can be significant.

A further disadvantage of clamp techniques relates to the time required to activate the clamp. Often movable stages are utilized in high throughput operations, and the additional time required to activate the clamp (1) increases the time required for each movement; and (2) does not decrease the "settling time" of the stage. The settling time refers to the amount of time for required oscillations of the stage to cease after the stage has moved to a new rest position.

Clamping arrangement can also be unreliable as a result of the numerous additional components introduced into the movable stage system. In addition, in the case of a piezoelectrically activated clamp, only limited travel of the clamp is obtainable, and therefore particular care must be taken in machining and assembling the stage such that the surface of the movable stage does not move out of the range of the clamp as the stage moves along its length of travel. The clamping surface of the stage must be extremely parallel to the travel axis of the stage.

As an alternative to automatic clamps, manually activated clamps may be utilized, however manual clamping is not practical for automated operations, particularly high output operations. In addition, manual clamps also retain the disadvantageous introduction of transient forces into the system.

In addition, if movement prevention is provided by merely utilizing an extremely stiff leadscrew and nut, as well as the bearings holding the leadscrew, the expense of the stage assembly can increase dramatically, while still yielding less than satisfactory results.

Accordingly, an improved movable stage assembly is desired in which the stage can be successively moved to plural rest positions, with the stage securely positioned at each of the rest positions such that undesired movement (e.g., vibration) at the rest positions is reduced. The movable stage should be capable of moving from one rest position to another, without having the movement impeded by any devices which prevent movement at the rest position. In addition, a device or assembly which prevents undesirable movement of the stage should be inexpensive, preferably requiring no additional power sources or automatic control devices.

SUMMARY AND OBJECTS OF THE INVENTION

Accordingly, it is an object of the present invention to provide an improved movable stage assembly in which the stage assembly can be moved to successive rest positions, with undesired movement of the stage avoided at each of the successive rest positions.

It is another object of the present invention to provide a stiffener assembly which adds stiffness to the movement of the stage, particularly in the direction of travel of the stage, without introducing undesirable movement or force to the stage.

It is a further object of the present invention to provide a stiffener for a movable stage assembly which does not require the use of electrical power or electrical controls, and further which reduces the need for special machining for tightly controlling the parallelism of other components of the stage assembly.

It is a further object of the present invention to provide a stiffener assembly for a movable stage which is simple and inexpensive.

These and other objects and advantages are attained in accordance with the present invention which provides a stiffener for a movable stage assembly. The stiffener can be mounted to the base of the stage assembly, and includes a force applicator, for example a spring, which urges a relatively large block member against the movable stage. The stiffener assembly has a substantial length in the direction of travel of the movable stage, and thus provides high stiffness in the direction of travel, with the stiffening capabilities extending along the entire length of travel of the movable stage. In addition, a relatively small amount of force is provided by the force applicator, thereby preventing undesired movement of the stage as well as preventing wear as a result of the contact between the stiffening member or block and the stage.

As the stiffener is urged against the stage, a small amount of friction is provided between the stiffener and the stage top. This friction is small enough such that motion of the stage via the screw is not significantly impeded. However, when the stage stops at a rest position, the friction is sufficient to maintain a coupled relationship between the stiffener and stage top, and since the stiffener has a high degree of stiffness in the axis of movement, the stage top is rigidly held in place. Advantageously, the stiffener is continuously in contact with the stage, even during movement from one rest position to another. However, due to the small amount of force provided by the force applicator, the friction generated between the stiffener and the stage is readily overcome by the leadscrew when movement is desired.

In accordance with one aspect of the present invention, it has been recognized that, contrary to the goals of many stage manufacturers (who try to minimize friction), the introduction of a small amount of friction by a stiffener element or stiffener assembly actually improves the performance of the stage assembly.

BRIEF DESCRIPTION OF THE DRAWINGS

A more complete appreciation of the invention and the many attendant advantages thereof will become readily apparent from the following detailed description, particularly when considered in conjunction with the drawings in which:

FIG. 4 is a graph showing the operational time achieved by the present invention;

DESCRIPTION OF THE PREFERRED EMBODIMENTS

Figure 5:
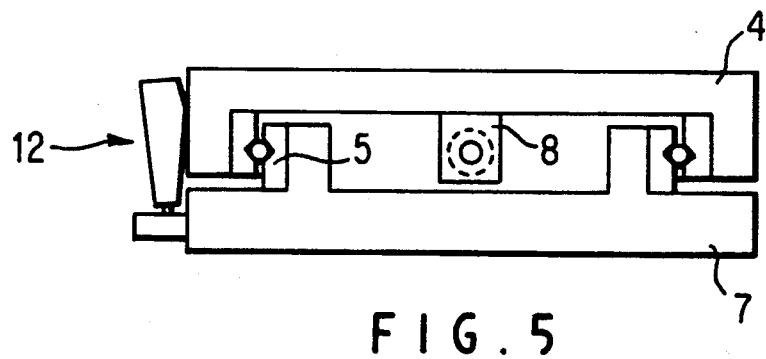
FIG. 5 is a drawing showing a first preferred embodiment of the stiffener in accordance with the present invention.

Referring now to the drawings, wherein like reference numerals depict like or corresponding elements, FIG. 5 shows a stiffener assembly 12 in accordance with an embodiment of the present invention. As shown in FIG. 5, the stiffener 12 is fixedly connected to the base 7, with a top portion of the stiffener assembly contacting the movable stage 4. As shown in further detail in FIG. 6, the stiffener assembly 12 includes three basic components. First, a mount 14 is provided for mounting the stiffener to the base 7. At the top of the stiffener, a large block-like member 15 is provided which is in contact with the stage 4, with the contact maintained by a force applicator, such as a spring 16, e.g., a leaf spring. The elements 14, 15, 16 may be assembled from separate components, or may be formed as an integral assembly.

The leaf spring 16 interconnects the mount 14 and the member 15, and urges the member 15 into contact with the stage 4 on a side surface 18 of the stage 4. As a result, frictional forces are developed between the member 15 and the stage surface 18. The force imparted by the force applicator 16 is relatively small, such that only a small amount of force is applied against the surface 18, and the frictional force does not impede movement of the stage by the leadscrew (with the movement direction into the drawing figures in FIGS. 5 and 6). For example, a force on the order of one pound or less can be sufficient in precision applications, however greater or lesser forces may be suitable for other applications.

Figure 6:
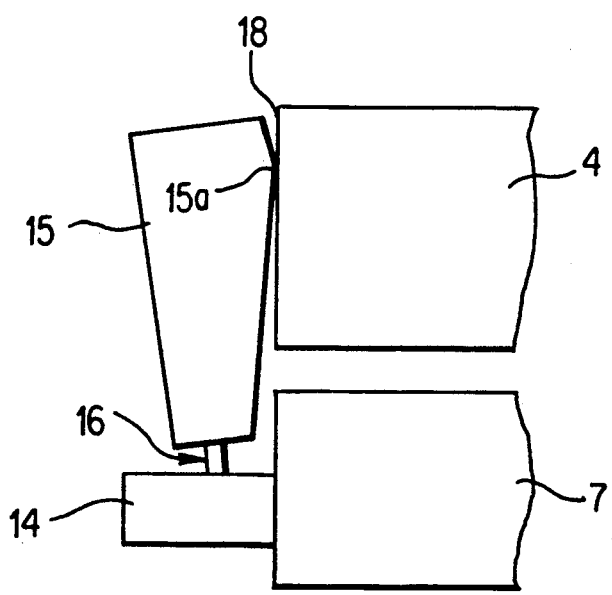
FIG. 6 is an enlarged view of the stiffener shown in FIG. 5.
Figure 10:
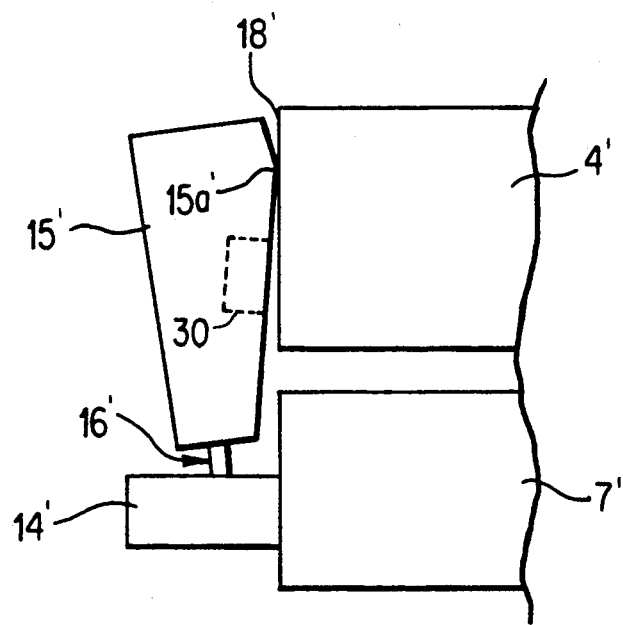
FIG. 10 shows an alternate embodiment in which a magnet is utilized for urging the stiffener into contact.

As shown in FIG. 6, the member 15 thus establishes a line or point contact at 15a. As an alternative to the use of a spring as shown in FIG. 10, may also be utilized for urging the member 15 toward the stage 4. The magnet is disposed at the location below the contact 15a, for example in a hollowed portion of the member 15.

Figure 7:
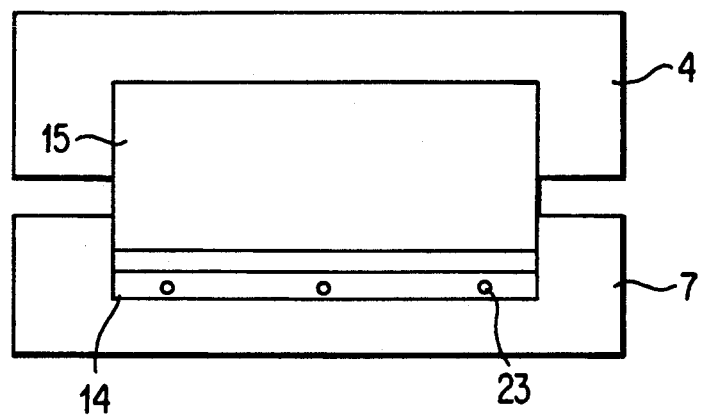
FIG. 7 is a side view of the stiffener shown in FIG. 6.

Referring now to FIG. 7, a side view of the FIG. 6 arrangement is shown. As will be noted, the stiffener 12 includes a longitudinal dimension or length which extends along a substantial length. As a result, the stiffener 12 is extremely stiff in the direction of movement. For example, the stiffener can be readily formed with a stiffness of 500,000 lb/inch in the direction of movement of the stage. Thus, the stiffener can be formed to have a stiffness in the direction of movement at least one hundred times the stiffness in the direction orthogonal to the direction of movement.

The stiffener elements 14-16 can be formed of steel, and a length of approximately, for example, three inches will provide significantly improved stiffness in the direction of movement. This will provide significantly more stiffness than, for example, a leadscrew which typically holds the stage in place. Leadscrews typically have only 10,000 lb/inch stiffness to hold the stage in place. The length of the stiffener can also ensure contact between the stiffener and the table throughout the entire length of travel of the stage, thereby ensuring consistent stiffening along the length of travel of the stage for preventing movement at successive rest positions.

Figure 11:
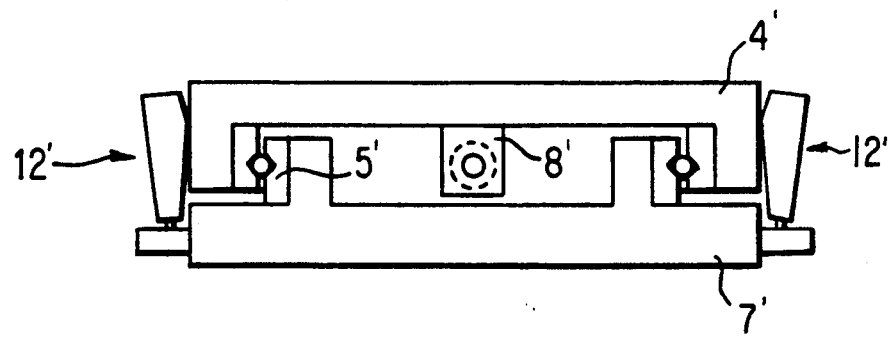
FIG. 11 shows a modification of the FIG. 5 arrangement in which plural stiffeners are provided.

As shown in FIGS. 5-7, the stiffener is mounted upon the base, for example by screws 23. However, it is to be understood that the stiffener may also be fixedly mounted upon the movable stage, with the stiffener member or block member 15 in frictional contact with the base 7. In addition, more than one stiffener 12 can be utilized in a stage assembly, for example by providing stiffeners on both sides of the stage assembly. The use of plural stiffeners is illustrated in FIG. 11, wherein corresponding elements are designated by primed numerals.

Thus, with the arrangement shown in FIGS. 5-7, the stiffener assembly provides a stiffening member (e.g. 15) which is in frictional contact with the stage assembly at one end, with the stiffener assembly fixedly mounted to the stage assembly at another end. All three elements of the stiffener have extremely high stiffness in the direction of movement of the stage. However, the flexure or force applicator element 16, which connects the stiffener base or mount 14 and the top 15, provides a constant, relatively small force against the stage along the entire length of travel of the stage, regardless of whether the stage side surface 18 is perfectly machined or not. Thus, the requirement for extremely parallel machining associated with prior clamping devices is avoided, since the spring or flexure element 16 can have a low spring constant such that even movement of tens of microns results in only a small percentage change of the spring force. As a result, the force applied to the stage is consistent along the length of travel regardless of machining inconsistency.

Figure 1:
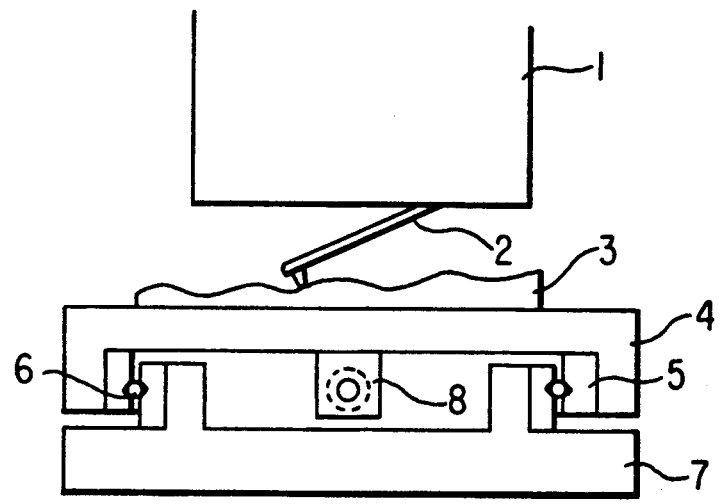
FIG. 1 is a simplified side view of a linear travel ball bearing stage having a specimen mounted thereon for scanning by a scanning probe microscope.
Figure 2:
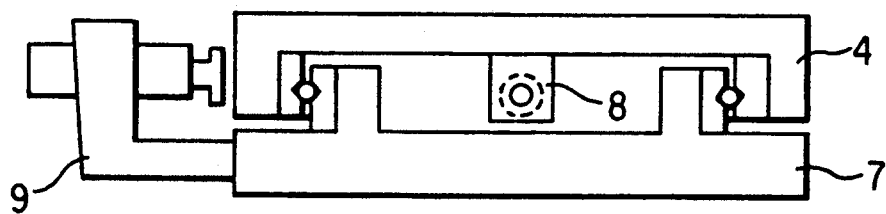
FIG. 2 is a stage similar to that of FIG. 1, with a clamp utilized for clamping the stage at a rest position.
Figure 3:
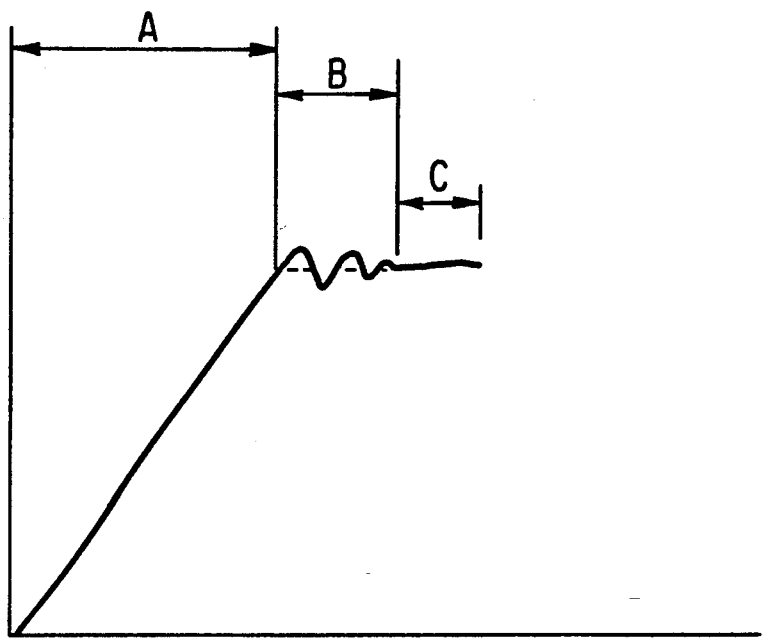
FIG. 3 is a graph of time versus position, illustrating the settling time associated with the use of a clamping device.

In addition to the improved capabilities in maintaining a motionless rest position, the present invention is also advantageous from a time saving standpoint. For example, as shown in FIG. 3, in a typical stage assembly which utilizes a clamp for fixing a rest position, the amount of time required for movement to a new rest position includes: (1) the time during which the leadscrew is moving the stage, represented by A; (2) the settling time after the leadscrew has ceased movement, as represented by B in FIG. 3; and (3) the time required for activation of the clamp represented by C. Thus, the total time required to establish a new rest position is represented by A+B+C. By contrast, as shown in FIG. 4, in accordance with the present invention, not only is the clamping time C eliminated, but the settling time is markedly reduced. Thus, the overall time required for moving the stage to a new rest position is significantly reduced.

A coating may also be advantageously utilized in the FIG. 6 embodiment. The coating may be placed on the member 15 at least at the contact location 15a, or may be placed upon the surface 18. The coating will allow static friction, but can provide a better matching between static and dynamic friction. Perhaps more importantly, the coating can reduce particle generation and reduce wear associated with the sliding contact between the member 15 and the stage 4.

Figure 8:
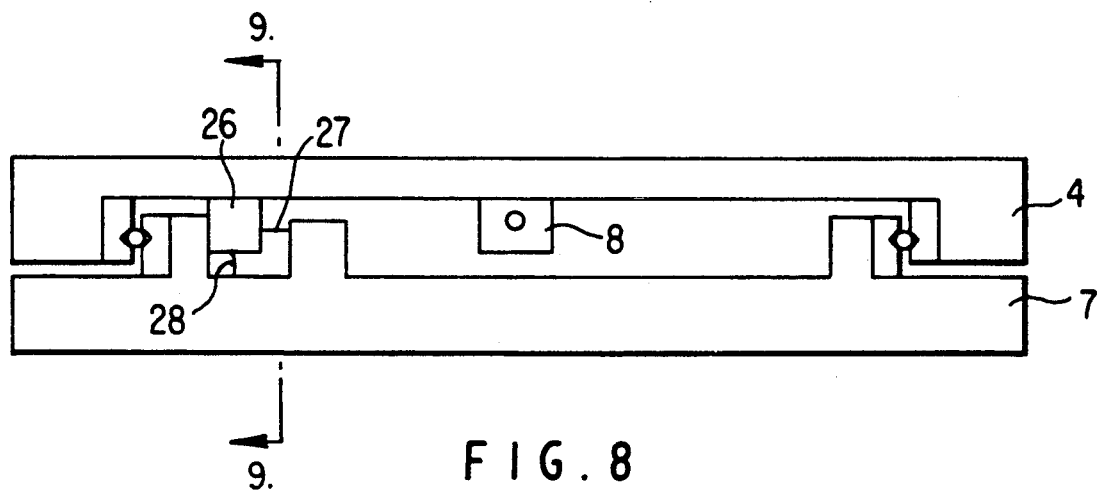
FIG. 8 depicts a second embodiment of the present invention.
Figure 9:
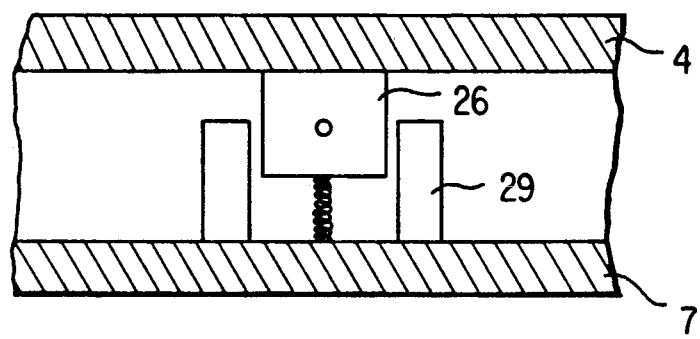
FIG. 9 shows a view of the stiffener arrangement of FIG. 8 taken along section 9—9.

Referring now to FIG. 8, an alternate embodiment of the present invention is shown. In the FIG. 8 arrangement, the stiffener includes a block 26 which is pushed against the underside of the stage top as well as the stage base by springs 27, 28. Thus, a frictional force is created between the stage base and the stiffener, as well as between the stiffener and the stage top, thereby rigidly coupling the stage top to the base when the stage is in a rest position. The leadscrew readily overcomes the frictional forces so that desired motion of the stage top is not appreciably impeded. As with the FIG. 6 embodiment, the surfaces of the block 26 in contact with the stage may be coated, or the stage underside may be coated with a material which provides better matching of static and dynamic friction, less particle generation and less wear. Such materials can include, for example, tungsten disulfide, molybdenum disulfide, or polytetrafluoroethylene. A partial section of the FIG. 8 arrangement is shown in FIG. 9, taken along lines 9—9. As shown in FIG. 9, the embodiment also includes a pair of stops 29, which are omitted from the drawing in FIG. 8 for purposes of clarity. In the FIG. 8 drawing, one of these stops would be in front of the block 26, while the other would be behind the block 26. The stops 29 limit undesired movement of the block 26, thereby maintaining the proper coupling relationship between the stage 4 and the base 7.

Thus, the stiffeners in accordance with the present invention improves the performance of sliding devices, particularly those requiring high precision and/or stability. The invention is particularly advantageous in establishing successive rest positions, from both stability and timesaving standpoints. The invention can also allow for improved control as a movable member or stage is moved with respect to a base.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the U.S. is:

1. A movable stage device comprising:
   a base;
   a stage supported on said base;
   means for moving said stage relative to said base in a first direction;
   a stiffener member and means for applying a force for urging said stiffener member against at least one of said stage and said base, and wherein said means for applying a force applies two forces in respective two directions, wherein each of said two directions are orthogonal to said first direction.

2. A movable stage device comprising:
   a base;
   a stage supported on said base;
   means for moving said stage relative to said base in a first direction;
   a stiffener member which contacts said base and sad stage, and means for applying two forces in respective two directions, wherein one of said two forces urges the stiffener member against said stage, and the other of said two forces urges said stiffener member against a portion of said base.

3. The movable stage of claim 2, wherein said two directions are each orthogonal to said first direction of movement of the stage.

4. The movable stage of claim 2, wherein a plurality of said stiffener members are provided, each of which contacts at least one of said stage and said base at a corresponding plurality of locations.

5. The movable stage of claim 2, wherein said stiffener member creates a stiff mechanical path by coupling the movable stage and said base, and wherein said stiffener member is substantially stiffer than said means for moving the stage.

6. A movable stage device comprising:
   a base;
   a stage supported on said base;
   means for moving said stage relative to said base in a first direction;
   a stiffener member which contacts said stage, and means for applying a force such that said stiffener member is urged into contact with said stage, and wherein said means for applying a force urges said stiffener member against an underside of said stage.

7. A movable stage device comprising:
   a base;
   a stage supported on said base;
   means for moving said stage relative to said base;
   a stiffener mounted on one of said base and said stage, said stiffener contacting the other of said base and said stage, and wherein said stiffener has a low stiffness in a direction orthogonal to a direction of movement of said stage, and a high stiffness in said direction of movement.

8. The movable stage of claim 7, wherein said stiffener includes a first member contacting one of said stage and said base, and means for applying a force urging said first member against said one of said stage and said base.

9. The movable stage device of claim 8, wherein said means for moving said stage relative to said base moves said stage in a first direction, and wherein said means for applying a force applies a force in a direction orthogonal to said first direction.

10. The movable stage of claim 9, wherein said means for applying a force includes a spring.

11. The movable stage of claim 10, wherein said spring is a leaf spring having a length extending substantially parallel to said first direction.

12. The movable stage of claim 7, wherein said means for applying a force includes a coil spring.

13. The movable stage device of claim 7, wherein said means of applying a force includes a magnet.

14. The movable stage of claim 7, wherein the stiffener has a stiffness in a direction of movement of said stage at least one hundred times greater than a stiffness orthogonal to the direction of movement.

15. The movable stage of claim 7, wherein a plurality of said stiffeners are provided, each of which contacts at least one of said stage and said base at a corresponding plurality of locations.

16. The movable stage of claim 7, wherein a pair of bearings are provided for supporting said stage upon said base, and wherein said stiffener is mounted between said bearings.

17. The movable stage of claim 7, wherein said stiffener creates a stiff mechanical path by providing a coupling between the movable stage and said base, and wherein the stiffener is substantially stiffer than said means for moving the stage.

18. The movable stage device of claim 17, wherein said means for moving said stage includes a lead screw.

19. A stiffener for use in a movable stage assembly in which said stage is movably mounted upon a base, comprising:
   a first member for contacting one of a stage and a base;
   means for applying a force to said first member to urge said first member into contact with said one of said stage and said base;
   a mounting member for mounting said stiffener to the other of said stage and said base, and wherein said stiffener has a high stiffness in a direction, and a low stiffness in a second direction orthogonal to said first direction.

20. The stiffener of claim 19, wherein said stiffness in said first direction is at least one hundred times greater than said stiffness in said second direction.

21. The stiffener of claim 19, wherein said means for applying a force applies a force orthogonal to a length of said stiffener.

22. A movable stage assembly comprising:
   a base;
   a stage movably mounted upon said base such that said stage is movable in a first direction with respect to said base;
   a stiffener having a length extending in said first direction such that said stiffener has a high stiffness in said first direction, said stiffener connected to one of said stage and said base and in contact with the other of said stage and said base, said stiffener further including a force applicator which urges said stiffener into contact with said other of said stage and said base.

23. The movable stage assembly of claim 22, wherein said stiffener includes a first member contacting said other of said stage and said base, and a mount for mounting said stiffener to said one of said stage and said base, and wherein said force applicator is located between said first member and said mount.

24. The movable stage assembly of claim 23, wherein said stiffener has a stiffness in said first direction which is substantially greater than a stiffness in a second direction.

25. The movable stage assembly of claim 24, wherein said second direction is orthogonal to said first direction.

26. The movable stage assembly of claim 22, wherein said force applicator includes a leaf spring having a length extending in said first direction.

27. A scanning probe microscope including a movable stage, wherein a sample to be examined is mounted upon said stage, the apparatus comprising:
a base;
a stage supported on said stage;
means for moving said stage relative to said base;
a stiffener which contacts portions of said stage, wherein said stiffener is extremely stiff in a direction of movement of the stage and has a low stiffness in a direction orthogonal to the direction of movement of said stage.

28. The scanning probe microscope of claim 27, wherein said stiffener creates a stiff mechanical path by providing a coupling between said stage and said base, and wherein the stiffener is substantially stiffer than said means for moving said stage.

29. A scanning probe microscope including a movable stage assembly, said stage assembly including:
a base;
a stage supported on said base;
means for moving said stage relative to said base;
a stiffener which contacts both moving and nonmoving portions of said stage assembly, wherein the stiffener is extremely stiff in a direction of motion of the stage and has a low stiffness in a direction orthogonal to the direction of movement of said stage.

30. A method for examining a specimen utilizing a scanning probe microscope comprising:
providing a specimen and a scanning probe microscope;
mounting one of said scanning probe microscope and said specimen upon a movable stage assembly in which said stage assembly includes a stage which is mounted for relative movement with respect to a base;
mounting a stiffener upon one of said stage and said base such that said stiffener contacts the other of said stage and said base;
wherein the step of providing a stiffener includes providing a stiffener having a high stiffness in a direction of movement of said stage, and a relatively low stiffness in a direction orthogonal to said direction of movement of said stage, whereby said stiffener provides a mechanical coupling between said base and said stage.

31. A movable stage device comprising:
a base;
a stage supported on said base;
means for moving said stage relative to said base in a first direction;
a stiffener assembly including a mounting member, a stiffener member, and a means for applying a force, said mounting member mounted upon one of said stage and said base, said stiffener member contacting the other of said stage and said base, and said means for applying a force disposed between said stiffener member and said mounting member and urging said stiffener member against said other of said stage and said base;
wherein said stiffener assembly has a stiffness significantly greater than a stiffness of said means for moving said sage in said first direction, and wherein said stiffener assembly also has a stiffness in a direction of movement of said stage which is significantly greater than a stiffness of said stiffener assembly in a direction orthogonal to said direction of movement.

* * * * *